(12) United States Patent
Nakamoto et al.

(10) Patent No.: US 10,516,360 B2
(45) Date of Patent: Dec. 24, 2019

(54) ELECTRIC WORKING MACHINE

(71) Applicant: MAKITA CORPORATION, Anjo-shi, Aichi (JP)

(72) Inventors: Akihiro Nakamoto, Anjo (JP); Itsuku Kato, Anjo (JP); Yuki Kawai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 6 days.

(21) Appl. No.: 15/484,479

(22) Filed: Apr. 11, 2017

(65) Prior Publication Data

US 2017/0302211 A1 Oct. 19, 2017

(30) Foreign Application Priority Data

Apr. 18, 2016 (JP) ................................. 2016-082851

(51) Int. Cl.
| | |
|---|---|
| *H02P 23/28* | (2016.01) |
| *H02P 27/06* | (2006.01) |
| *B23D 45/16* | (2006.01) |
| *B23D 47/12* | (2006.01) |
| *H02M 1/08* | (2006.01) |
| *H02M 7/06* | (2006.01) |

(52) U.S. Cl.
CPC .............. *H02P 27/06* (2013.01); *B23D 45/16* (2013.01); *B23D 47/12* (2013.01); *H02M 1/083* (2013.01); *H02M 7/06* (2013.01)

(58) Field of Classification Search
CPC ....... B23D 45/16; B23D 47/12; H02M 1/083; H02P 27/06
USPC .... 318/751, 794, 817, 629, 812, 504, 8, 654
See application file for complete search history.

(56) References Cited

U.S. PATENT DOCUMENTS

| | | | |
|---|---|---|---|
| 6,315,081 B1 * | 11/2001 | Yeo ........................... | B66B 5/02 |
| | | | 187/290 |
| 9,242,566 B2 * | 1/2016 | Harada ..................... | H02P 9/48 |
| 2013/0039108 A1 * | 2/2013 | Watanabe ............... | H02M 7/48 |
| | | | 363/131 |
| 2015/0145446 A1 * | 5/2015 | Shitabo ................... | H02P 27/06 |
| | | | 318/400.3 |
| 2016/0197573 A1 * | 7/2016 | Iwata ...................... | H02P 27/04 |
| | | | 318/400.26 |

FOREIGN PATENT DOCUMENTS

JP 2015-009316 A 1/2015

* cited by examiner

*Primary Examiner* — Muhammad S Islam
(74) *Attorney, Agent, or Firm* — Oliff PLC

(57) ABSTRACT

An electric working machine of an example of the present disclosure includes: a motor; a power supply portion; a controller; and a voltage detector. The power supply portion generates a DC voltage to drive the motor by rectifying an AC voltage supplied from an AC power source and smoothing by a capacitor. The controller controls energization of the motor. The voltage detector detects the AC voltage. The controller is configured to interrupt the energization when the voltage detector does not detect the AC voltage.

16 Claims, 3 Drawing Sheets

ELECTRIC WORKING MACHINE

CROSS-REFERENCE TO RELATED APPLICATIONS

This application claims the benefit of Japanese Patent Application No. 2016-82851 filed on Apr. 18, 2016 with the Japan Patent Office, the disclosure of which is incorporated herein by reference.

BACKGROUND

The present disclosure relates to an electric working machine that works by being supplied with electric power from an AC power source.

As electric working machines such as electric power tools and so on, an apparatus has been known, which is configured to generate a DC voltage to drive a motor by rectifying an AC voltage applied from an AC power source, such as a commercial power source and so on, by a rectifying circuit, such as a diode bridge and so on, and by smoothing an output of the rectifying circuit by a capacitor (e.g., Japanese Unexamined Patent Application Publication No. 2015-9316.).

SUMMARY

In this type of electric working machine, when a user inserts a power supply plug into an outlet of the AC power source, the AC power source supplies electric current to the electric working machine and the capacitor for smoothing is electrically charged through the rectifying circuit.

Accordingly, when the power supply plug is removed from the outlet of the AC power source and electric current supply from the AC power source is interrupted, the motor is supplied with DC voltage from the capacitor and is allowed to be driven until the capacitor is electrically discharged.

This type of behavior of the electric working machine is not what was intended for the user who recognizes that "the electric apparatus does not work when the power supply plug is out of the outlet," and provides the user with a sense of discomfort.

According to an aspect of the present disclosure, in an electric working machine provided with a power supply portion configured to rectify an AC voltage supplied from an AC power source and to smooth the AC voltage by a capacitor, it is preferable that a motor is not driven when electric current supply from the AC power source is interrupted.

An electric working machine according to the aspect of the present disclosure includes: a motor; a power supply portion; a controller; and a voltage detector. The power supply portion generates a DC voltage to drive the motor by rectifying an AC voltage supplied from an external AC power source and smoothing the AC voltage by a capacitor. The controller controls energization to the motor from the power supply portion. The voltage detector detects the AC voltage supplied from the external AC power source.

The controller interrupts the energization to the motor and stops the motor when there is no detection of the AC voltage by the voltage detector.

Therefore, according to this electric working machine, when the power supply plug is pulled out of the outlet of the AC power source and the power supply from the AC power source has been interrupted, the voltage detector does not detect the AC voltage and the energization to the motor is interrupted, which leads to stopping the motor.

Accordingly, for the user who recognizes that "the electric appliance does not work by pulling the power supply plug out of the outlet", the behavior of the electric working machine of the present disclosure in the situation where the power supply plug is out of the outlet of the AC power source may reduce or eliminate discomfort. Therefore, it improves the usability of the electric working machine.

It is also possible to stop the motor by interrupting the energization to the motor when the power supply from the AC power source is off due to power outage and so on. Therefore, it is also possible to inhibit the motor from rotating by electric charge stored at the capacitor in the event of a power outage.

Here, the voltage detector may be configured to detect a voltage value of the AC voltage or to detect a zero-cross point of the AC voltage. In this case, the controller may be configured to determine the absence of the detection of the AC voltage when the voltage value detected by the voltage detector is smaller than a threshold value for a predetermined time or more or when the voltage detector does not detect the zero-cross point.

The electric working machine of the present disclosure may include a voltage generator which receives the DC voltage outputted from the power supply portion via the capacitor and generates a drive voltage to drive the controller.

In this case, electric charge stored in the capacitor is discharged by the voltage generator and the controller when the power supply from the AC power source to the electric working machine has been interrupted. Thereby, it is possible to reduce or eliminate prolonged accumulation of electric charge at the capacitor.

That is, if driving the motor is stopped while the electric charge able to drive the motor has been stored at the capacitor, it takes time to discharge the electric charge from the capacitor. For example, electric shock is likely to occur when a user puts his hand inside the electric working machine for the purpose of maintenance inspection and so on and touch the capacitor. However, discharging the electric charge in the capacitor by the voltage generator and the controller can inhibit this sort of problem from occurring.

The electric working machine includes a discharger that discharges an electric charge of the capacitor according to a command of the controller. The controller may be configured to output the command to the discharger and allows the discharger to discharge the electric charge of the capacitor when the voltage detector does not detect the AC voltage. Accordingly, it is possible to reduce or eliminate the above described problem by immediately discharging the electric charge stored at the capacitor when power supply from the AC power source to the electric working machine is interrupted.

The discharger may include a first resistor and a transistor that is turned to an on state in response to a command from the controller and connects the first resistor to the capacitor in parallel. Accordingly, the discharger can discharge the electric charge accumulated at the capacitor rapidly when the controller determines that the power supply from the AC power source has stopped.

The electric working machine may further include a second resistor connected to the capacitor in parallel. A resistance value of the first resistor may be smaller than a resistance value of the second resistor. The second resistor can gradually discharge the electric charge accumulated at the capacitor when the power supply from the AC electric current has been stopped.

The power supply portion may include a diode bridge that rectifies the full waves of the AC voltage supplied from the AC power source and the capacitor that smooths rectified electric current. Accordingly, DC voltage is generated. It is therefore possible to drive the motor by use of the DC voltage generated.

BRIEF DESCRIPTION OF THE DRAWINGS

The present disclosure will now be described by way of example with reference to the accompanying drawings, in which.

DETAILED DESCRIPTION OF THE PREFERRED EMBODIMENTS

Figure 1:
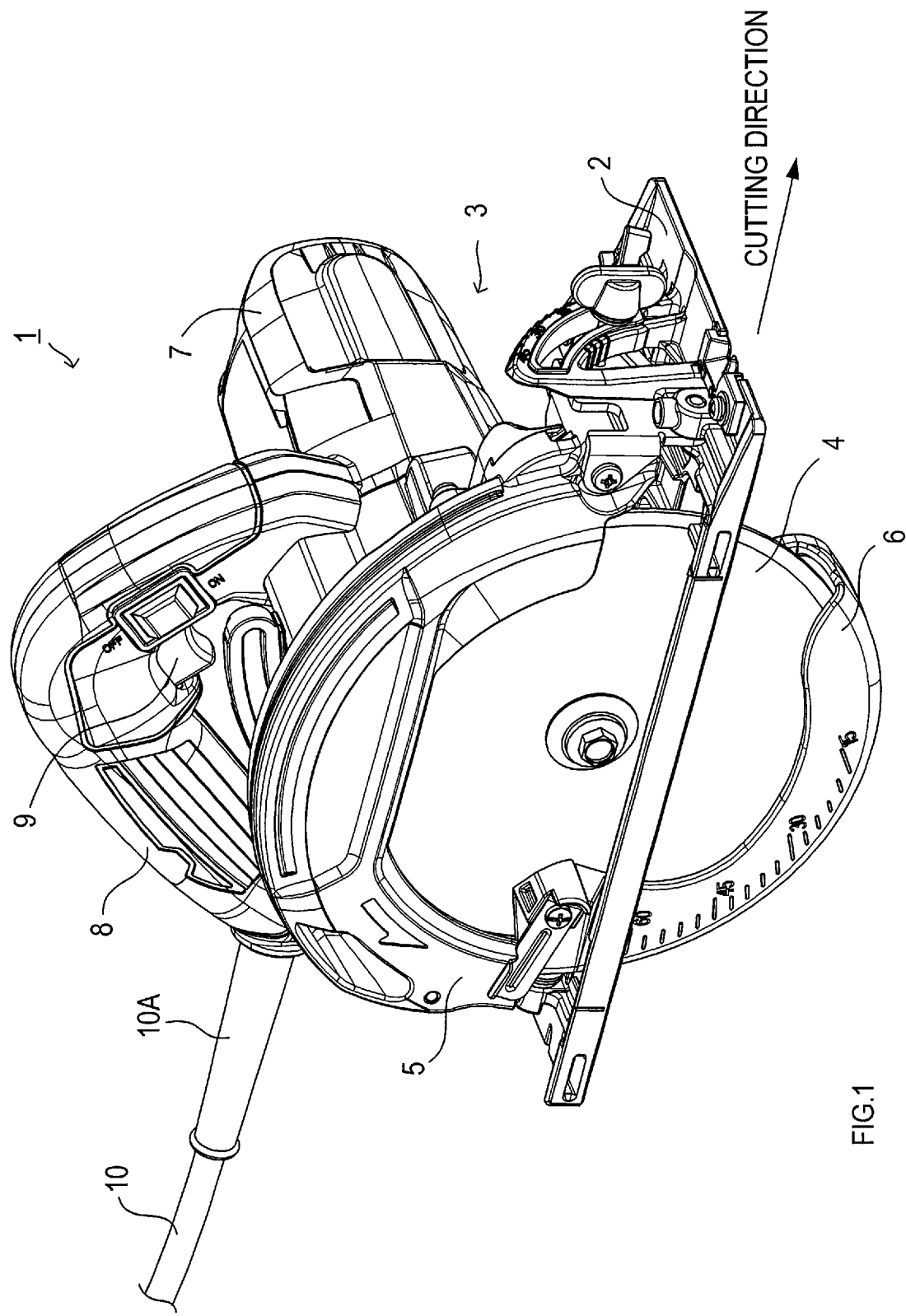
FIG. 1 is a perspective view showing an external appearance of a circular saw according to an embodiment of the present disclosure.

As shown in FIG. 1, a circular saw 1 as an electric working machine in the present embodiment includes a base 2 and a main body 3. The base 2 is of approximately rectangular shape, and the base 2 is connected with an upper surface of a workpiece (illustration omitted) that is a subject of cutting. The main body 3 is arranged around the upper surface of the base 2.

The main body 3 has a round blade 4 and a blade casing 5. The peripheral edge of the approximately half periphery at the upper side of the blade 4 is housed inside the blade casing 5 and is covered thereby. The peripheral edge of the approximately half periphery at the lower side of the blade 4 is covered by a folding cover 6. This cover 6 rotates in a clockwise direction in FIG. 1 in the rotation center of the blade 4 and opens gradually when the circular saw 1 is moved in a cutting direction when the workpiece is cut. The blade 4 is then exposed and the exposed portion cuts into the workpiece.

When the circular saw 1 is seen along the cutting direction shown as an arrow in FIG. 1, the blade 4 is arranged at the right side of the main body 3 to the cutting direction and an approximately cylindrically shaped motor casing 7 is arranged at the left side of the main body 3 to the cutting direction. A motor 20 (see FIG. 2) as a driving source of the circular saw 1 is housed in the motor casing 7. A gear mechanism is housed in the center of the main body 3 between the motor casing 7 and the blade 4.

The gear mechanism works to transmit the rotation of the motor 20 to the blade 4. According to the embodiment, the motor 20 is configured with a brushless motor.

An arch shaped handle 8 is attached to the upper side at the center of the main body 3 so that a user can hold the handle 8. That is, when the circular saw 1 is seen along the cutting direction shown as an arrow in FIG. 1, one end of the handle 8 is fixed to the rear end side of the main body 3 to the cutting direction and the other end thereof is fixed to the ahead of the rear end to the cutting direction.

A trigger type operation switch 9 is provided at the inner peripheral side of the handle 8 so that a user can operate the operation switch 9 while holding the handle 8. The operation switch 9 is allowed to remain at an on state for operation via a lock button (illustration omitted).

A power cord 10 is led from the rear end of the main body 3 to the cutting direction. A power supply plug (illustration omitted) is attached to the tip end of the power cord 10. By putting the power supply plug into the outlet of an AC power source 12 (see FIG. 2) such as a commercial power source and so on, the power cord 10 takes power for driving the motor 20 (AC voltage) from the AC power source 12 to the main body 3. The main body 3 is provided with a cylindrically shaped cord guard 10A to protect the power cord 10.

A driving apparatus 30 (see FIG. 2) is housed in the main body 3 and is worked by power supply from the external AC power source 12 via the power cord 10. The driving apparatus 30 rotates the motor 20 (further blade 4) when the operation switch 9 is in an operation state (on state).

Figure 2:
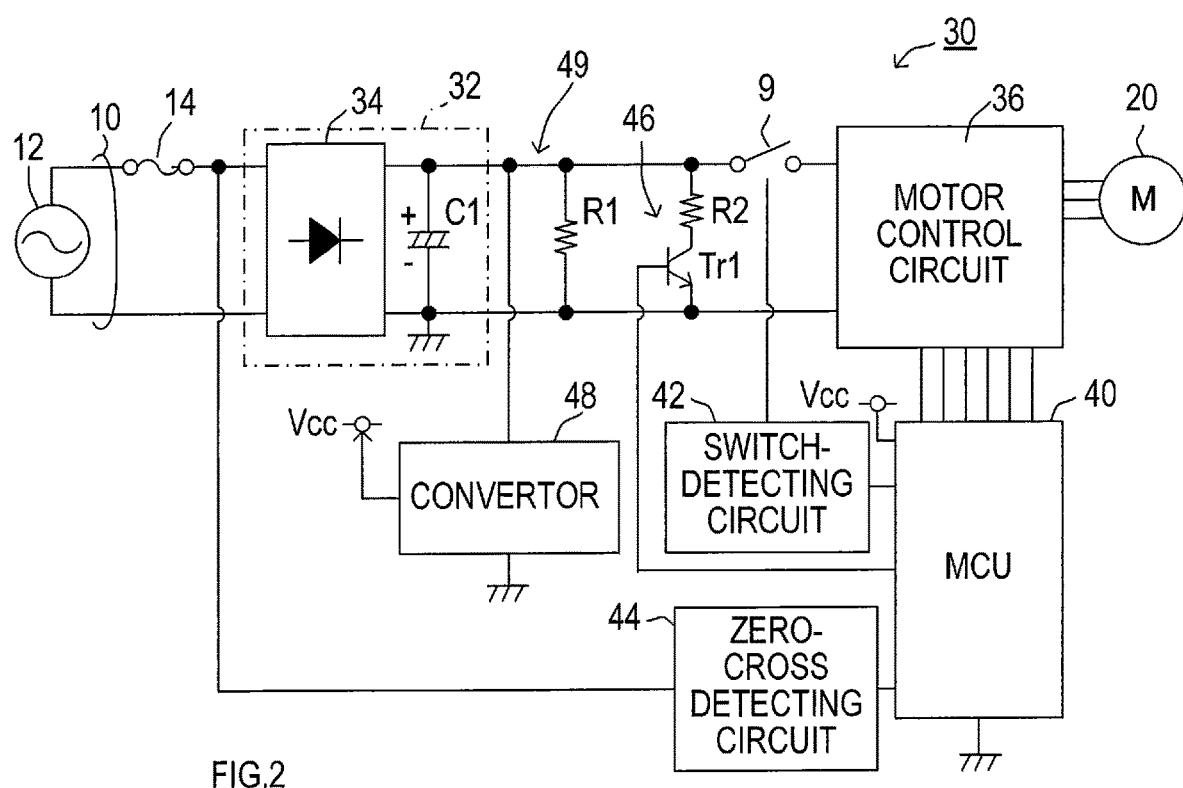
FIG. 2 is a block chart showing a configuration of a driving apparatus according to the embodiment.

As illustrated in FIG. 2, the driving apparatus 30 comprises a capacitor C1 as a power supply portion 32 to generate a DC voltage to drive the motor 20. The driving apparatus 30 further may include a diode bridge 34 as the power supply portion 32. The diode bridge 34 rectifies the full waves of the AC voltage supplied from the AC power source 12 via the power cord 10 and a fuse 14.

The capacitor C1 smooths the output of the diode bridge 34. The DC voltage smoothed by the capacitor C1 is outputted to a motor control circuit 36 via a power supply circuit.

The operation switch 9 is provided on a power supply circuit 49 (at the positive electrode side in FIG. 2) extending from the power supply portion 32 to the motor control circuit 36. When the operation switch 9 is in the on state, the DC voltage is supplied to the motor control circuit 36 to drive the motor 20.

The motor 20 is configured with a three-phase brushless motor. The terminals of the respective phases of the motor 20 are connected, via the control circuit 36, to the power supply circuit 49 extending from the power supply portion 32.

That is, the motor control circuit 36 is configured with a full bridge circuit (in other words, inverter circuit) provided with a high-side switch and a low-side switch to connect the terminals of the respective phases of the motor 20 to the positive and negative electrode sides of the power supply circuit 49. The high-side switch and the low-side switch in the motor control circuit 36 are configured with at least a switching element such as a MOSFET and so on.

The switching element is turned on and off in response to a control signal from the MCU (Micro Control Unit) 40 as a controller. When the switching element is in the on state, the switching element connects the terminals of the respective phases of the motor 20 to the positive or negative electrode side of the power supply circuit 49 and generates a circuit to energize the motor 20.

The MCU 40 is a known controller mainly configured with a CPU (Central Processing Unit), a ROM (Read Only Memory), a RAM (Random Access Memory), and so on. The MCU 40 controls driving the motor 20 in accordance with a program stored in the ROM. When the motor 20 is driven, the MCU 40 turns on and off the switching element in the motor control circuit 36 and controls electric current supply to the respective phases of the motor 20.

The driving apparatus 30 includes a switch-detecting circuit 42 and a zero-cross detecting circuit 44. The switch-detecting circuit 42 is configured to detect on and off states of the operation switch 9. The zero-cross detecting circuit 44 is configured to detect a zero-cross point of the AC voltage supplied from the external AC power source via the power cord 10 and the fuse 14.

The switch-detecting circuit 42 is an example of a switch-detecting portion of the present disclosure. The zero-cross detecting circuit 44 is an example of a voltage detector of the present disclosure. Detection signals from the detecting circuits 42 and 44 are inputted into the MCU 40 and are employed by the MCU 40 to control driving the motor 20.

A resistance R1 and a discharger 46 are provided at the power supply circuit 49 which supplies electric current from the power supply portion 32 to the motor control circuit 36. The resistance R1 and the discharger 46 are each connected to the capacitor C1 in parallel. The resistance R1 is employed to gradually discharge electric charge accumulated at the capacitor C1 when the power supply from the AC power source 12 has been stopped.

The discharger 46 includes a resistance R2 and a transistor Tr1. The resistance R2 discharges the electric charge accumulated at the capacitor C1 as well as the resistance R1. In response to a discharge command from the MCU 40, the transistor Tr1 is turned to the on state and connects the resistance R2 to the capacitor C1 in parallel. The transistor Tr1 is a NPN bipolar transistor in FIG. 2, but the transistor Tr1 can be a field effect transistor such as MOSFET and so on.

This discharger 46 is employed to rapidly discharge the electric charge stored at the capacitor C1 when the MCU 40 determines in a control process described later that the power supply from the AC power source 12 was stopped. Therefore, a resistance value of the resistance R2 is smaller than the resistance value of the resistance R1.

The power supply circuit 49 to supply electric current from the power supply portion 32 to the motor control circuit 36 is connected to a DC-DC convertor (hereinafter, referred to as a convertor) 48 which generates a DC constant voltage Vcc to drive the MCU 40 and other peripheral circuits. The convertor 48 is an example of a voltage generator of the present disclosure. The MCU 40 is activated by receiving the DC constant voltage Vcc generated by the convertor 48.

Accordingly, in the circular saw 1 in the present disclosure, when the power supply plug is put into the outlet of the AC power source 12 and power supply is implemented from the AC power source 12 via the power cord 10, DC constant voltage Vcc is generated by the convertor 48 and the MCU 40 is started.

Figure 3:
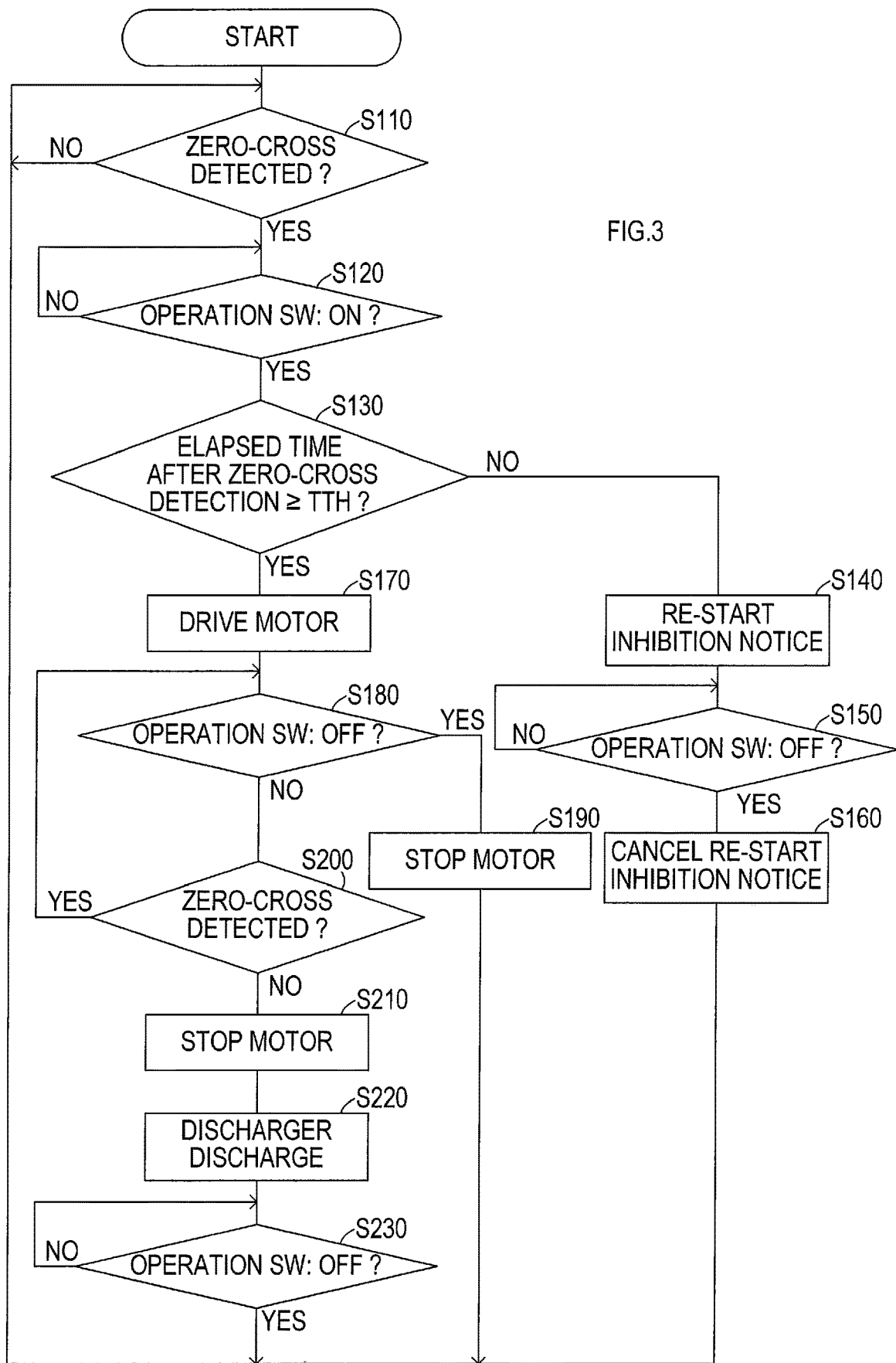
FIG. 3 is a flowchart showing a control process implemented by an MCU illustrated in FIG. 2.

After startup, the MCU 40 performs the control process illustrated in FIG. 3 and controls driving the motor 20. Described below is the control process.

As illustrated in FIG. 3, in this control process, the MCU 40 first determines in S110 the presence or absence of the detection of the zero-cross point of the AC voltage by the zero-cross detecting circuit 44. When there is no detection of the zero-cross point, the process at S110 is implemented again to wait for detection of the zero-cross point.

When the MCU 40 determines at S110 the presence of the detection of the zero-cross point, the process proceeds to S120. At S120, the MCU 40 determines whether the operation switch 9 was operated and is at the on state. When the operation switch 9 is not at the on state, the process at S120 is implemented again to wait for the operation of the operation switch 9 and switching to the on state thereof.

When the MCU 40 determines at S120 that the operation switch 9 is in the on state, the process proceeds to S130. At S130, the MCU 40 determines whether an elapsed time between the presence of the determination of the zero-cross point detection at S110 and the determination of the on state of the operation switch 9 at S120 is a set time Tth or more.

In this determination process, when the elapsed time is short, it is thought that the power supply plug was inserted into the outlet while the operation switch 9 is at the on state. The above determination process is implemented to judge this state.

For example, in a state where the operation switch 9 is at the on state by the lock button, if the power supply plug is put in the outlet, the AC voltage is supplied from the AC power source 12, and the motor 20 is driven, it is likely that the round blade works suddenly before an operator gets ready, which may surprise the operator.

Therefore, according to the embodiment, this state is determined at S130 based upon the elapsed time. When the elapsed time is smaller than the set time Tth, the motor 20 is not started (restarted) and the process proceeds to S140. At S140, the operator is noticed that the re-start was inhibited by turning on a display lamp (not illustrated) configured with an LED and so on.

After implementing the process in S140, the process proceeds to S150. At S150, the MCU 40 determines whether the operation switch 9 was switched to the off state to wait for switching of the operation switch 9 to the off state. When the operation switch 9 is shifted to the off state, the process proceeds to S160. At S160, the display lamp turned on at S140 is turned off and the notice of the re-start inhabitation is cancelled. The process then proceeds to S110 again.

At S130, when the elapsed time is determined to be or greater than the set time Tth, the process proceeds to S170. At S170, driving the motor 20 is initiated. At S180 following S170, the MCU 40 determines whether the operation switch 9 was switched to the off state. When the operation switch 9 is at the off state, the process proceeds to S190. Driving the motor 20 is stopped at S190, and the process proceeds to S110 again.

Meanwhile, when the operation switch 9 is determined at S180 not to be at the off state, the process proceeds to S200. At S200, the MCU 40 determines the presence or absence of the detection of the zero-cross point of the AC voltage by the zero-cross detecting circuit 44. When there is the presence of the detection of the zero-cross point, the process proceeds to S180. When there is the absence of the detection of the zero-cross point, the process proceeds to S210 and driving the motor 20 is stopped.

That is, when the MCU 40 determines at S200 that the zero-cross point is not detected, it can be determined that the power supply from the AC power source 12 was interrupted during driving the motor 20. In this case, driving the motor 20 is stopped forcedly at S210.

At S220 following S210, electric charge accumulated at the capacitor C1 is discharged via the resistance R2 by allowing the transistor Tr1 of the discharger 46 to be at the on state for a predetermined period of time. The process then proceeds to S230.

At S230, the MCU 40 determines whether the operation switch 9 was switched to the off state to wait for switching of the operation switch 9 to the off state. When the operation switch 9 was shifted to the off state, the process proceeds to S110 again.

As described above, in the circular saw 1 of the present embodiment, electric power is supplied to the power supply portion 32 from the external AC power source 12. The MCU 40 is activated and the control process starts when the motor 20 is allowed to be driven.

In this control process, when the zero-cross point of the AC voltage is not detected by the zero-cross detecting circuit 44, driving the motor 20 is prohibited. When the operation switch 9 is turned to the on state when there is the detection of the zero-cross point of the AC voltage by the zero-cross detecting circuit 44, driving the motor 20 is started. In response to the switching of the operation switch 9 to the off state, driving the motor 20 is stopped. When the zero-cross point of the AC voltage is not detected by the zero-cross detecting circuit 44 anymore during driving the motor 20, the MCU 40 determines that the power supply from the AC power source 12 was interrupted, and driving the motor 20 is compelled to be stopped.

Therefore, according to the circular saw 1 in the present embodiment, it is possible to inhibit continuing to drive the motor 20 when the power supply plug is out of the outlet of the AC power source 12. Accordingly, it reduces or eliminates discomfort for the user, the user who recognizes that "the electric apparatus does not work by pulling out the power supply plug from the outlet," thereby enabling to enhance usability for such users. It is also possible to inhibit the motor 20 from being rotated by electric charge accumulated at the capacitor C1 in the event of power outage of the AC power source 12, blow off the fuse 14, or the like.

The MCU 40 is activated by receiving power supply from the convertor 48 which generates the DC constant voltage Vcc following the output of the power supply portion 32. Therefore, it is possible to discharge electric charge of the capacitor C1 when the power supply from the AC power source 12 is off.

The driving apparatus 30 of the present embodiment includes the discharger 46, which discharges the capacitor C1 immediately. When the power supply from the AC power source 12 is interrupted and driving the motor 20 is compelled to be stopped, the MCU 40 outputs a drive signal to the transistor Tr1 of the discharger 46 so that the transistor Tr1 is turned on and electric charge stored at the capacitor C1 is discharged.

Therefore, according to the circular saw 1 in the present embodiment, storing electric charge at the capacitor C1 over a prolonged period of time is inhibited when the power supply from the AC power source 12 has been interrupted, so that the user is prevented from electric shocks occurred by touching the capacitor C1.

The present disclosure should not be limited by the above-described embodiment, and can be practiced in various manners.

For example, according to the above embodiment, the discharger 46 is provided at the power supply circuit 49 extending from the power supply portion 32 to the motor control circuit 36 and further to the motor 20, but the discharger 46 is not necessarily provided. However, it is preferable to provide, at the power supply circuit 49, an electrical load capable of discharging the capacitor C1 such as the resistance R1 and so on.

The drive voltage to operate the MCU 40 as the controller is described above to be generated by the convertor 48, which is activated by receiving the power supply from the power supply portion 32. However, the MCU 40 may be operated by receiving power supply from another power source, such as a built-in battery.

According to the present embodiment, the motor 20 is a brushless motor, and the motor control circuit 36 that controls energizing current to the motor 20 is housed in the driving apparatus 30.

However, for example, the motor 20 may be a brush motor. For example, the MCU 40 as the controller may be configured to turn on and off a switching element provided at the power supply circuit 49 extending from the power supply portion 32 to the motor 20 in response to the on and off states of the operation switch 9.

According to the above-described embodiment, the voltage detector is configured with a zero-cross point detecting circuit. However, the voltage detector does not necessarily employ a zero-cross point detecting circuit as far as the controller can determine the presence or absence of supply of the AC voltage.

According to the above-described embodiment, the circular saw 1 is an example of the electric working machine. However, the electric working machine of the present disclosure may be provided with a power supply portion that rectifies an AC voltage supplied from an AC power source, smooths the AC voltage, and generates a DC voltage to drive a motor. Further, the electric working machine of the present disclosure is, for example, an electric tool for masonry, an electric tool for metalwork, an electric tool for woodworking, an electric tool for gardening, or so on.

More specifically, the electric working machine of the present disclosure may be applied to an electric working machine, such as an electric hammer, an electric hammer drill, an electric drill, an electric driver, an electric wrench, an electric grinder, an electric reciprocating saw, an electric jigsaw, an electric cutter, an electric chain saw, an electric plane, an electric pile driver (including a riveter), an electric hedge trimmer, an electric mower, an electric lawn clipper, an electric bush cutter, an electric cleaner, an electric blower, and so on.

Multiple functions of a single element according to the above embodiment may be fulfilled by multiple elements, or a single function of a single element may be fulfilled by multiple elements. Multiple functions of multiple elements may be fulfilled by a single element, or a single function fulfilled by multiple elements may be fulfilled by a single element. The configuration of the above-described embodiment may be partially omitted. At least a part of the configuration of the above-described embodiment may be added or replaced to other configurations of the above-described embodiment. Any modes encompassed in a technical idea specified by the description in the scope of claims shall be embodiments of the present disclosure.

The technology of the present disclosure can also be fulfilled by various modes, such as a system including an electric working machine as an element, a program to configure a computer to function as an electric working machine, a non-transitory tangible storage media such as a semiconductor memory storing this program, a method of controlling an electric working machine, and so on.

What is claimed is:
1. An electric working machine comprising:
a motor;
a power supply portion to generate a DC voltage to drive the motor by rectifying and smoothing an AC voltage supplied from an AC power source, wherein the power supply portion includes a capacitor for smoothing;
a controller that controls driving of the motor; and
a voltage detector that detects the AC voltage,
wherein the voltage detector is configured to detect a zero-cross point of the AC voltage, and
wherein the controller is configured to interrupt the driving of the motor so as to stop the motor when the controller determines that the zero-cross point of the AC voltage is not detected by the voltage detector while the motor is driven.
2. The electric working machine according to claim 1, further comprising:

a voltage generator that receives the DC voltage outputted from the power supply portion and generates a DC constant voltage to power the controller.

3. The electric working machine according to claim 1, further comprising:
a discharger that discharges an electric charge of the capacitor following a command of the controller,
wherein the controller is configured to output the command to the discharger and allows the discharger to discharge the electric charge of the capacitor when the voltage detector does not detect the AC voltage.

4. The electric working machine according to claim 1, wherein
the power supply portion includes a diode bridge that rectifies the full waves of the AC voltage inputted from the AC power source and the capacitor.

5. The electric working machine of claim 1, further comprising:
a fuse configured to receive, at a first end of the fuse, an alternating current (AC) associated with the AC voltage supplied from the AC power source;
a diode bridge connected to a second end of the fuse, and configured to rectify the AC voltage after passing through the fuse;
a slow discharge resistor connected directly in parallel with the capacitor, and configured to slowly discharge the capacitor;
a discharger including a fast discharge resistor in series with a discharge transistor, wherein the discharger is connected directly in parallel with the capacitor, and wherein the fast discharge resistor has a smaller resistance value than the slow discharge resistor;
a motor control circuit configured to control the motor;
an operation switch connecting a first node of the diode bridge to the motor control circuit;
a switch-detecting circuit configured to detect a position of the operation switch; and
a zero-cross detecting circuit configured to detect a zero-cross of the alternating voltage at the second end of the fuse.

6. The electric working machine according to claim 3, wherein the discharger includes a first resistor and a transistor, wherein the first resistor is in a series with the transistor, wherein the transistor is turned to an on state in response to a command from the controller, and wherein the series is in parallel with the capacitor.

7. The machine of claim 5, wherein the controller is configured to:
determine that a first zero cross is detected;
determine that the operation switch is ON; and
determine whether an initial elapsed time, after the first zero cross was detected, is greater than or equal to an initial set time.

8. The electric working machine according to claim 6, further comprising:
a second resistor connected to the capacitor in parallel, wherein a resistance value of the first resistor is smaller than a resistance value of the second resistor.

9. The machine of claim 7, wherein the initial elapsed time is less than the initial set time, and wherein the controller is further configured to:
turn ON a re-start inhibition notice;
determine that the operation switch is OFF; and
cancel the re-start inhibition notice.

10. The machine of claim 7, wherein the initial elapsed time is greater than or equal to the initial set time, and wherein the controller is further configured to:
drive the motor;
determine that the operation switch is ON while the motor is driven;
determine that a driving zero-cross is not detected while the motor is driven;
stop the motor;
turn ON the discharger to discharge the capacitor; and
continue discharging the capacitor through the discharger until the operation switch is determined to be OFF.

11. The machine of claim 9, wherein the re-start inhibition notice is a light emitting diode (LED) in an ON state.

12. A machine comprising:
a fuse configured to receive an alternating current (AC) associated with an alternating voltage;
a diode bridge connected to a first end of the fuse and configured to rectify the alternating voltage;
a capacitor configured to smooth the rectified voltage;
a slow discharge resistor connected directly in parallel with the capacitor, and configured to slowly discharge the capacitor;
a discharger including a fast discharge resistor in series with a discharge transistor, wherein the discharger is connected directly in parallel with the capacitor, and wherein the fast discharge resistor has a smaller resistance value than the slow discharge resistor;
an operation switch connecting a first node of the diode bridge to a motor control circuit;
the motor control circuit configured to control a motor;
the motor;
a switch-detecting circuit configured to detect a position of the operation switch;
a zero-cross detecting circuit configured to detect a zero-cross of the alternating voltage at the first end of the fuse; and
a controller.

13. The machine of claim 12, wherein the controller is configured to:
determine that a first zero cross is detected;
determine that the operation switch is initially ON; and
determine whether an initial elapsed time, after the first zero cross was detected, is greater than or equal to an initial set time.

14. The machine of claim 13, wherein the initial elapsed time is greater than or equal to the initial set time, and wherein the controller is further configured to:
drive the motor;
determine that the operation switch is ON while the motor is driven;
determine that a driving zero-cross is not detected while the motor is driven;
stop the motor;
turn ON the discharger to discharge the capacitor; and
continue discharging the capacitor through the discharger until the operation switch is determined to be OFF.

15. The machine of claim 13, wherein the initial elapsed time is less than the initial set time, and wherein the controller is further configured to:
turn ON a re-start inhibition notice;
determine that the operation switch is OFF; and
cancel the re-start inhibition notice.

16. The machine of claim 15, wherein the re-start inhibition notice is a light emitting diode (LED) in an ON state.

* * * * *